(12) United States Patent
Weng et al.

(10) Patent No.: US 12,596,409 B2
(45) Date of Patent: Apr. 7, 2026

(54) ELECTRONIC DEVICE WITH EXPANDABLE SLIDING DISPLAY SCREEN

(71) Applicant: Lenovo (Beijing) Limited, Beijing (CN)

(72) Inventors: Feijun Weng, Beijing (CN); Ke Shang, Beijing (CN); Aiguo Zheng, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 254 days.

(21) Appl. No.: 18/457,917

(22) Filed: Aug. 29, 2023

(65) Prior Publication Data

US 2024/0103586 A1 Mar. 28, 2024

(30) Foreign Application Priority Data

Sep. 27, 2022 (CN) .......................... 202211186340.9

(51) Int. Cl.
*G06F 1/16* (2006.01)

(52) U.S. Cl.
CPC .......... *G06F 1/1681* (2013.01); *G06F 1/1616* (2013.01); *G06F 1/1624* (2013.01); *G06F 1/1652* (2013.01); *G06F 1/1679* (2013.01)

(58) Field of Classification Search
CPC .... G06F 1/1681; G06F 1/1616; G06F 1/1624; G06F 1/1652; G06F 1/1679
See application file for complete search history.

(56) References Cited

U.S. PATENT DOCUMENTS

| | | | | | |
|---|---|---|---|---|---|
| 5,229,920 | A | * | 7/1993 | Spaniol ................. | G06F 1/1679 361/679.55 |
| 5,481,430 | A | * | 1/1996 | Miyagawa ............ | G06F 1/1679 361/679.09 |
| 6,076,786 | A | * | 6/2000 | Meyer ................... | G06F 1/1683 248/920 |
| 6,229,693 | B1 | * | 5/2001 | Karidis ................. | G06F 1/1616 362/23.05 |
| 6,392,877 | B1 | * | 5/2002 | Iredale .................. | G06F 1/1616 361/740 |
| 6,504,707 | B2 | * | 1/2003 | Agata ................... | G06F 1/1683 248/920 |
| 7,903,400 | B1 | * | 3/2011 | Chen ..................... | G06F 1/1616 361/679.27 |

(Continued)

FOREIGN PATENT DOCUMENTS

CN 113050757 A * 6/2021 ........... G06F 1/1652

*Primary Examiner* — Allen L Parker
*Assistant Examiner* — Martin Antonio Asmat Uceda
(74) *Attorney, Agent, or Firm* — ANOVA LAW GROUP, PLLC

(57) ABSTRACT

An electronic device includes a first body, a second body, a connection device, and a flexible screen. The second body includes a first part and a second part. The second part is slidable to be pulled out relative to the first part to form an extended part or retracted to form a hidden part. The connection device connects the first body and the first part and includes a first shaft connected to the first part. The flexible screen covers the first body and the first part and covers the extended part when the second part is pulled out relative to the first part. The first part includes a lock structure. In response to the second part being retracted relative to the first part, the lock structure is in a first state.

10 Claims, 7 Drawing Sheets

(56)　　References Cited

U.S. PATENT DOCUMENTS

| | | | | | |
|---|---|---|---|---|---|
| 8,050,030 | B2 * | 11/2011 | Wu | G06F 1/1616 | 345/905 |
| 8,068,334 | B2 * | 11/2011 | Tang | G06F 1/1679 | 16/362 |
| 8,687,354 | B2 * | 4/2014 | Uchiyama | G06F 1/1681 | 296/186.4 |
| 8,687,355 | B2 * | 4/2014 | Hsu | G06F 1/162 | 345/473 |
| 8,711,576 | B2 * | 4/2014 | Goro | H05K 5/0226 | 361/814 |
| 9,104,382 | B2 * | 8/2015 | Chen | G06F 1/1681 | |
| 9,182,790 | B2 * | 11/2015 | Lee | G06F 1/1616 | |
| 9,244,496 | B2 * | 1/2016 | Sharma | G06F 1/1616 | |
| 9,277,659 | B2 * | 3/2016 | Onda | H05K 5/0217 | |
| 9,785,198 | B2 * | 10/2017 | Grinstead | G06F 1/1683 | |
| 10,008,135 | B2 * | 6/2018 | Lim | H05K 5/0226 | |
| 10,407,957 | B1 * | 9/2019 | Camp | F16D 27/105 | |
| 10,514,730 | B2 * | 12/2019 | Delpier | G06F 1/1618 | |
| 11,360,522 | B2 * | 6/2022 | Ho | G06F 1/1681 | |
| 11,543,857 | B2 * | 1/2023 | Alva | G06F 1/1616 | |
| 11,652,277 | B2 * | 5/2023 | Huang | H01Q 1/243 | 361/679.01 |
| 11,934,230 | B2 * | 3/2024 | Degner | H05K 5/0226 | |
| 2003/0038567 | A1 * | 2/2003 | Doan | G06F 1/1656 | 312/223.2 |
| 2003/0103324 | A1 * | 6/2003 | Gallivan | G06F 1/1683 | 361/679.27 |
| 2004/0228077 | A1 * | 11/2004 | Hall | G06F 1/1624 | 361/679.25 |
| 2006/0082518 | A1 * | 4/2006 | Ram | G06F 1/1675 | 345/1.1 |
| 2006/0130278 | A1 * | 6/2006 | Chen | G06F 1/1679 | 16/342 |
| 2006/0181842 | A1 * | 8/2006 | Liao | G06F 1/1667 | 361/679.09 |
| 2006/0183369 | A1 * | 8/2006 | Park | H04M 1/0214 | 439/517 |
| 2006/0185123 | A1 * | 8/2006 | Kuramochi | H04M 1/0212 | 16/221 |
| 2006/0236505 | A1 * | 10/2006 | Maatta | G06F 1/1681 | 16/366 |
| 2010/0077566 | A1 * | 4/2010 | Nishizawa | G06F 1/1616 | 16/344 |
| 2010/0142131 | A1 * | 6/2010 | Tang | G06F 1/1616 | 361/679.01 |
| 2011/0133619 | A1 * | 6/2011 | Ma | H05K 5/0226 | 16/375 |
| 2012/0099254 | A1 * | 4/2012 | Rogers | G06F 1/1637 | 361/679.01 |
| 2012/0262857 | A1 * | 10/2012 | Fukaya | G06F 1/1681 | 361/679.01 |
| 2013/0050916 | A1 * | 2/2013 | Yang | G06F 1/1616 | 361/679.01 |
| 2013/0194741 | A1 * | 8/2013 | Uchiyama | G06F 1/1681 | 361/679.02 |
| 2014/0063700 | A1 * | 3/2014 | Kawada | G06F 1/166 | 361/679.01 |
| 2014/0092566 | A1 * | 4/2014 | Shirasaka | G06F 1/1652 | 361/749 |
| 2014/0211108 | A1 * | 7/2014 | Matsumoto | G06F 1/1616 | 248/346.03 |
| 2014/0213324 | A1 * | 7/2014 | Tan | G06F 1/1677 | 455/566 |
| 2014/0362507 | A1 * | 12/2014 | Kinoshita | G06F 1/1681 | 16/374 |
| 2015/0043143 | A1 * | 2/2015 | Chen | G06F 1/1681 | 361/679.01 |
| 2015/0293562 | A1 * | 10/2015 | Nakamura | G06F 1/166 | 361/679.27 |
| 2017/0139442 | A1 * | 5/2017 | Yoshizumi | G06F 1/1641 | |
| 2017/0169741 | A1 * | 6/2017 | Lim | H04M 1/0247 | |
| 2017/0243526 | A1 * | 8/2017 | Lim | H05K 5/0226 | |
| 2020/0314225 | A1 * | 10/2020 | Ahn | G06F 1/1652 | |
| 2021/0151857 | A1 * | 5/2021 | Huang | G06F 1/1616 | |
| 2022/0269315 | A1 * | 8/2022 | Tsai | G06F 1/1616 | |
| 2023/0350468 | A1 * | 11/2023 | Yang | G06F 1/1681 | |
| 2025/0199570 | A1 * | 6/2025 | Vijayasarathy | G06F 1/1616 | |

* cited by examiner

31

10

32

ELECTRONIC DEVICE WITH EXPANDABLE SLIDING DISPLAY SCREEN

CROSS-REFERENCE TO RELATED APPLICATION

The present disclosure claims priority to Chinese Patent Application No. 202211186340.9, filed on Sep. 27, 2022, the entire content of which is incorporated herein by reference.

TECHNICAL FIELD

The present disclosure relates to an electronic device.

BACKGROUND

With the continuous development of science and technology, more and more flexible screens are used in electronic devices. When a flexible screen is used, the flexible screen is driven by a structure member to be pulled out to increase the display area. However, when the flexible screen is in a pull out state, if the electronic device is closed, the flexible screen is easily scratched, or the electronic device would operate abnormally.

SUMMARY

Embodiments of the present disclosure provide an electronic device, including a first body, a second body, a connection device, and a flexible screen. The second body includes a first part and a second part. The second part is slidable to be pulled out relative to the first part to form an extended part or retracted to form a hidden part. The connection device connects the first body and the first part and includes a first shaft connected to the first part. The flexible screen covers the first body and the first part and covers the extended part when the second part is pulled out relative to the first part. The first part includes a lock structure. In response to the second part being retracted relative to the first part, the lock structure is in a first state. In the first state, the first part is able to rotate with the first shaft to fold the second part relative to the first part. In response to the second part being pulled out relative to the first part, the lock structure is in a second state. In the second state, the lock structure restricts the first shaft to rotate to prevent the second part from being folded relative to the first part.

Figure 1:
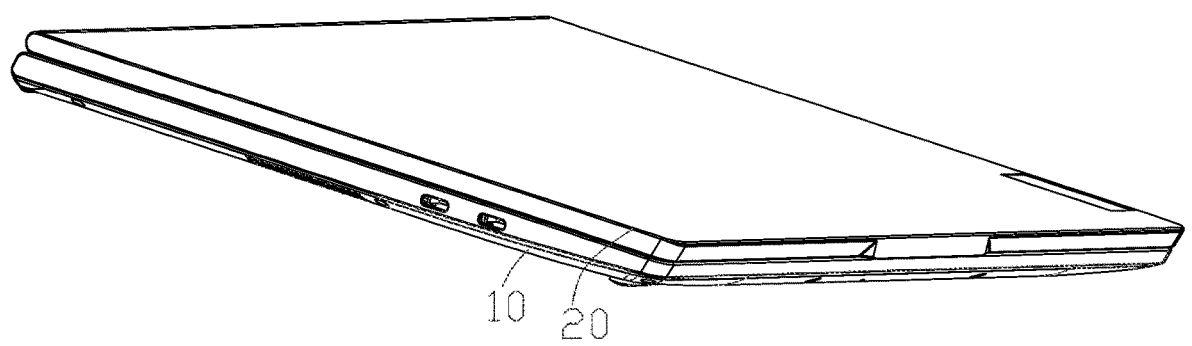
FIG. 1 illustrates a schematic structural diagram of an electronic device (in a folded state) according to some embodiments of the present disclosure.

| Reference numerals: | | |
|---|---|---|
| 10 First body | 20 Second body | 22 Second part |
| 30 Connection device | 31 First shaft | 32 Second shaft |
| 50 Lock structure | 51 Position-limiting connector | 511 First cooperation member |
| 512 Second cooperation member | | 52 Elastic member |
| 53 Position-limiting installation member | | 531 Accommodation groove |
| 532 First connection member | | 533 Second connection member |
| 54 Pressing plate | 60 Body connector | 61 Slot |
| 62 Hinge | 63 Plate-shaped member | |
| 71 Position-limiting connection member | | 711 Flat edge |
| 72 Position-limiting connection hole | | 721 Flat wall |

DETAILED DESCRIPTION OF THE EMBODIMENTS

Details are provided below to better understand the present disclosure. However, those skilled in the art can understand that the following description only illustrates some embodiments of the present disclosure. The present disclosure can be implemented without one or more of these details. In addition, to avoid confusion with the present disclosure, some known technical features in the field are not described in detail here.

An electronic device of embodiments of the present disclosure is described in detail in connection with FIGS. 1 to 10.

Figure 2A:
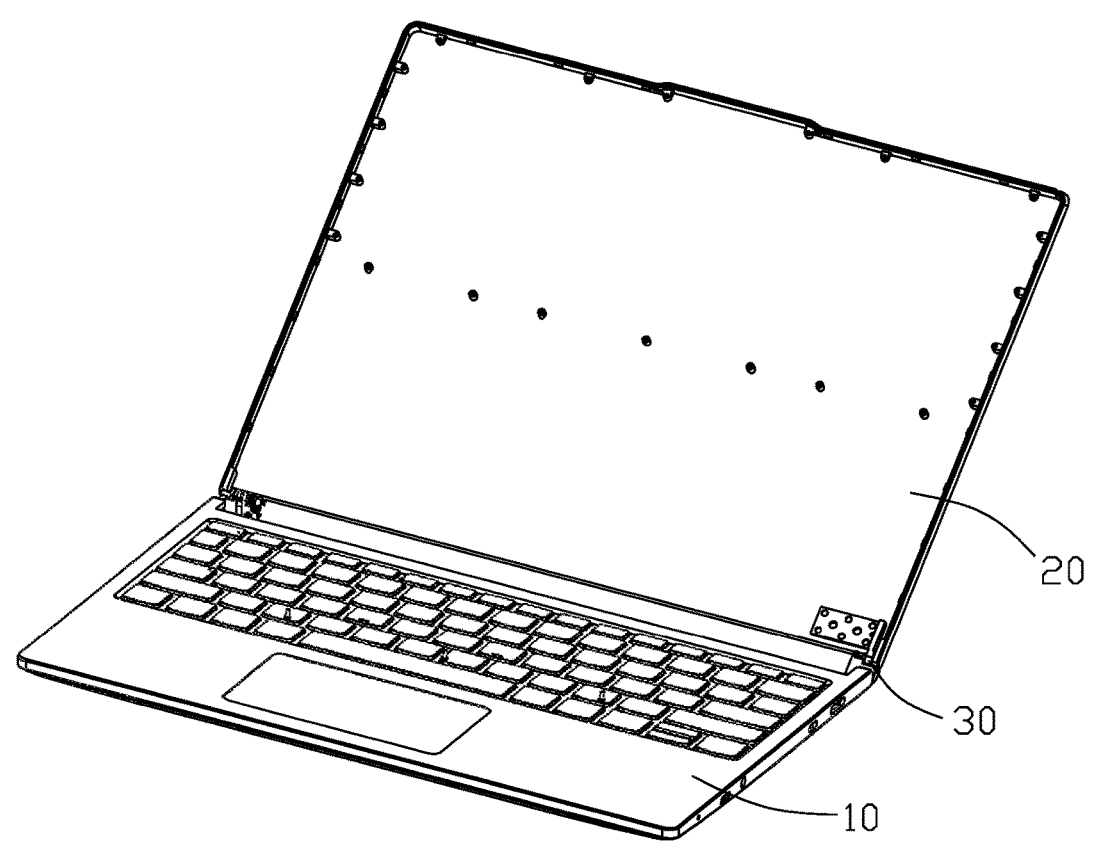
FIG. 2A illustrates a schematic structural diagram of an electronic device (in an expanded state, a second part being retracted relative to a first part) according to some embodiments of the present disclosure.
Figure 2B:
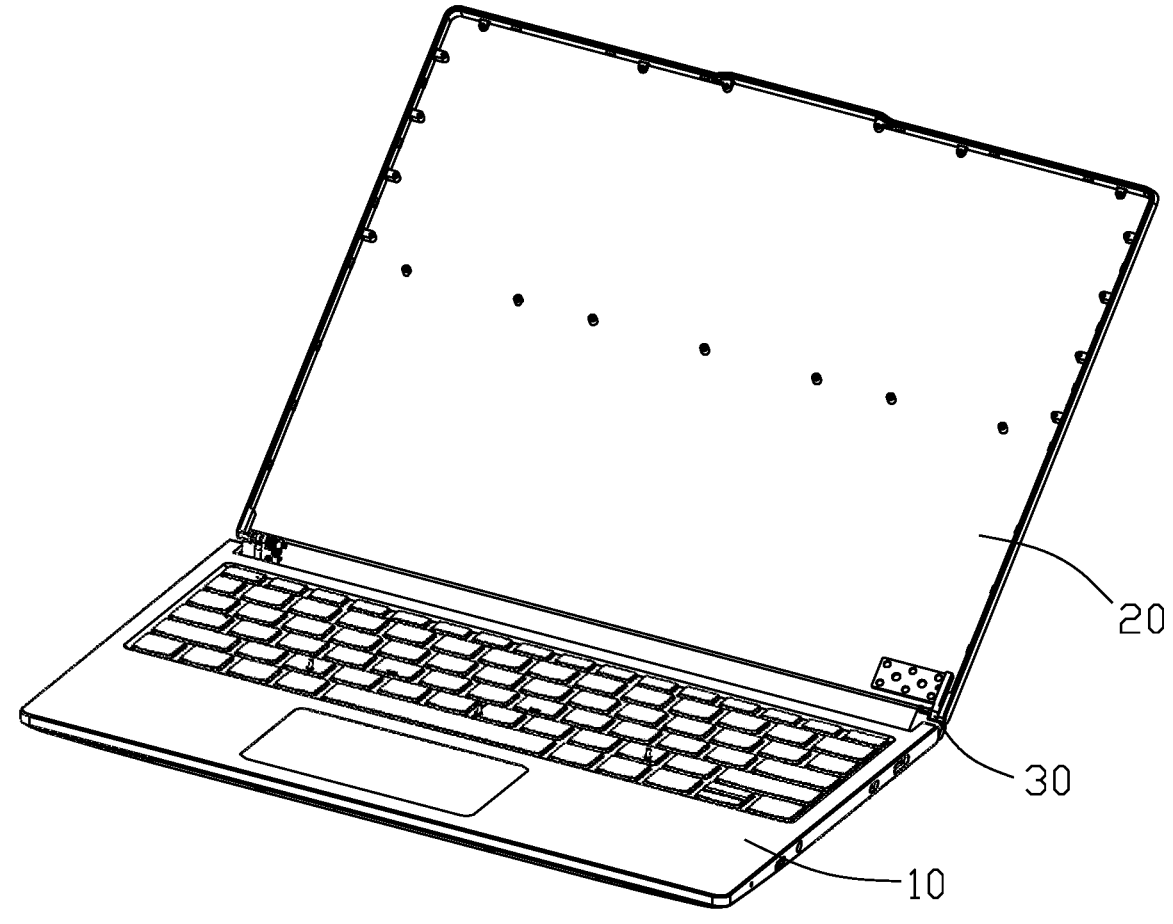
FIG. 2B illustrates a schematic structural diagram of an electronic device (in an expanded state, a second part being pulled out relative to a first part) according to some embodiments of the present disclosure.
Figure 3:
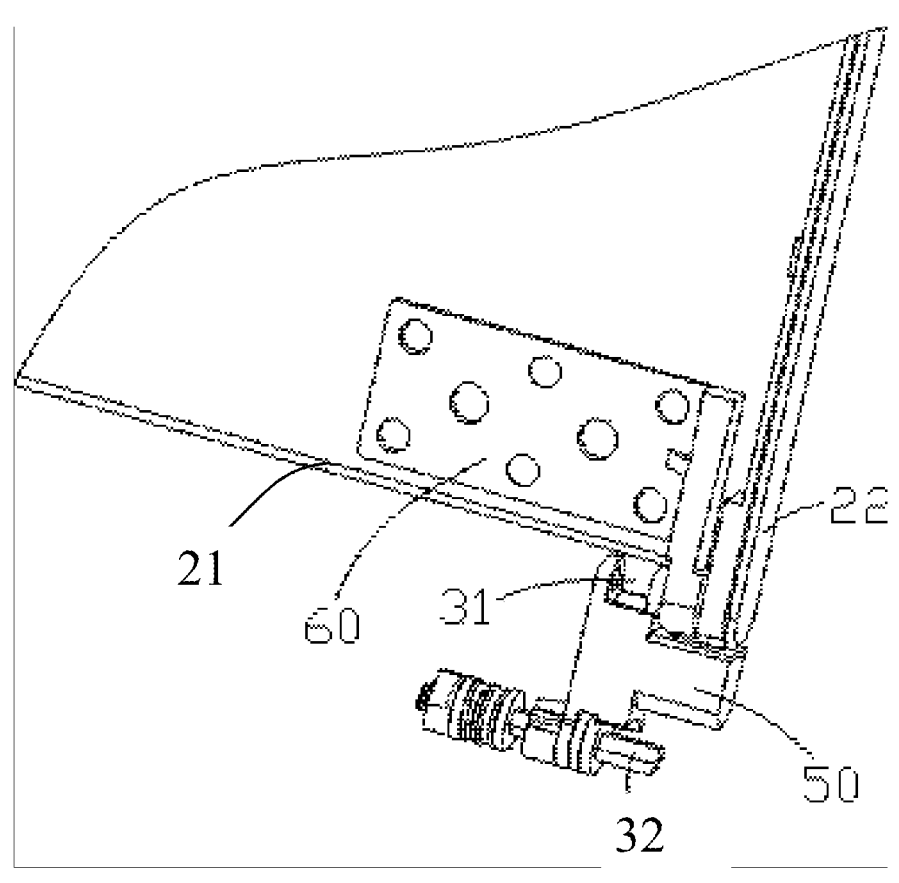
FIG. 3 illustrates a schematic local diagram showing a connection device and a lock structure of an electronic device according to some embodiments of the present disclosure.

As shown in FIG. 1, FIG. 2*a*, and FIG. 2*b*, the electronic device includes a first body 10, a second body 20, a connection device 30, and a flexible screen (not shown in the figure). The connection device 30 connects the first body 10 and the second body 20. The connection device 30 can be configured to cause the second body 20 and the first body 10 to be able to be folded or expanded relative to each other. As shown in FIG. 1, the second body 20 and the first body 10 are in a folded state relative to each other. That is, the electronic device is in the folded state. As shown in FIG. 2*a* and FIG. 2*b*, the second body 20 and the first body 10 are expanded relative to each other. That is, the electronic device is in the expanded state.

In embodiments of the present disclosure, a structure of the electronic device is not limited. For example, the electronic device can be an all-in-one computer, a television, or a laptop computer.

In embodiments of the present disclosure, a structure of the first body 10 is not limited. For example, the first body 10 can have a block-shaped structure, a plate-shaped structure, or a support structure with a base body. With the base body, the first body 10 can be configured to cause the electronic device to be able to be placed on a supporting surface. The supporting surface can be a desktop or a ground surface.

In embodiments of the present disclosure, the second body 20 includes a first part 21 and a second part 22. The second part 22 can slide to be pulled out with a pulled-out member or retracted with a hidden member relative to the first part 21. The second part 22 can be connected to the first part through a sliding rail. Thus, the second part 22 can be pulled out or retracted relative to the first part. The flexible screen can cover the first part 21 of the second body 20, and can cover the pulled-out member when the second part 22 slides to be pulled out relative to the first part 21. That is, when the second part 22 slides to be pulled out relative to the first part, the flexible screen 23 can be pulled out with the second part 22 to enlarge the display area.

In embodiments of the present disclosure, the structure of the connection device 30 is not limited. For example, the connection device 30 can be a two-axis hinge with a rotation-limiting mechanism (or a rotation switch mechanism).

For example, the first body 10 can be arranged at a keyboard end of a laptop computer, and the second body 20 can be arranged at a display end of the laptop computer. The electronic device can be closed and opened between the folded state and the expanded state through the connection device 30. The first body 10 can be a D shell of the laptop computer, and the second body 20 can be an A shell of the laptop computer.

As shown in FIGS. 3 to 6, in embodiments of the present disclosure, a lock structure 50 is arranged at the first part. The connection device 30 adopts a commonly used dual-shaft hinge with a first shaft 31 and a second shaft 32. The first shaft 31 can be configured to be connected to the first part. When the second part 22 is retracted relative to the first part, the lock structure 50 can have a first state. In the first state, the first part can rotate with the first shaft 31 to allow the second body 20 to be folded relative to the first body 10. When the second part 22 is pulled out relative to the first part, the lock structure 50 can have a second state. In the second state, the lock structure 50 can restrict the first shaft 31 from rotating to prevent the second body 20 to be folded relative to the first body 10.

In the electronic device of embodiments of the present disclosure, the first shaft 31 can be restricted from rotating to prevent the second body 20 from being folded relative to the first body 10 by arranging the lock structure 50 and when the second part 22 of the second body 20 is pulled out relative to the first part to drive the flexible screen to be pulled out. When the second part 22 is retracted relative to the first part, the lock of the first shaft 31 can be released to allow the second body 20 to be folded relative to the first body 10. Thus, the electronic device can be prevented from being closed when the flexible screen is in the pulled-out state to scratch the flexible screen or cause the electronic device to be abnormal.

In some embodiments of the present disclosure, the lock structure 50 may not be directly connected to the first shaft 31 to restrict the rotation of the shaft 31. Instead, a body connector 60 can be arranged at a shaft end of the first shaft 31. The first part and the first shaft 31 can be connected integrally through the body connector 60. Thus, when the first shaft 31 rotates, the second body 20 can rotate with the first shaft 31. When the first shaft 31 is restricted from rotating, the second body 20 can be also restricted from rotating.

Figure 4:
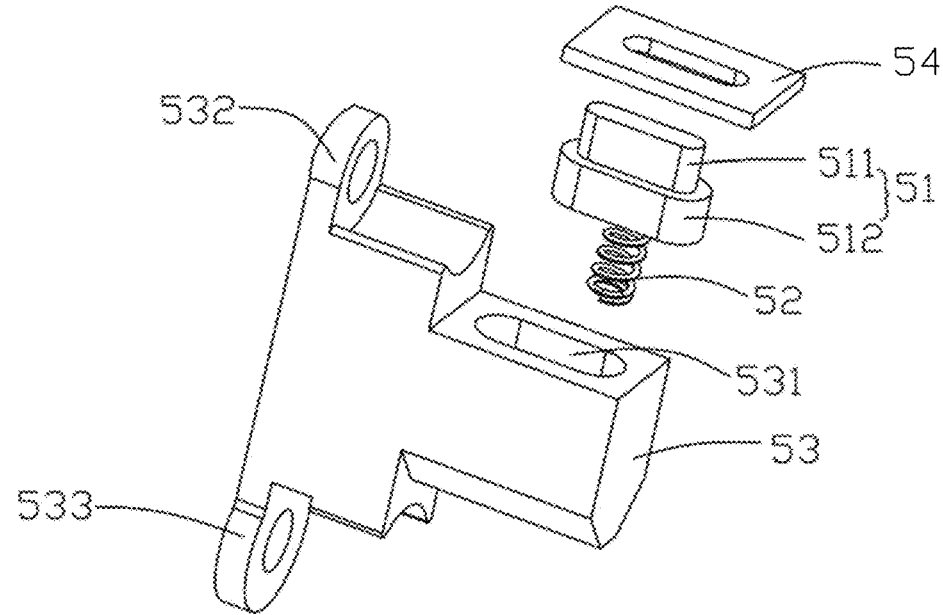
FIG. 4 illustrates a schematic exploded diagram of the lock structure in FIG. 3.
Figure 5:
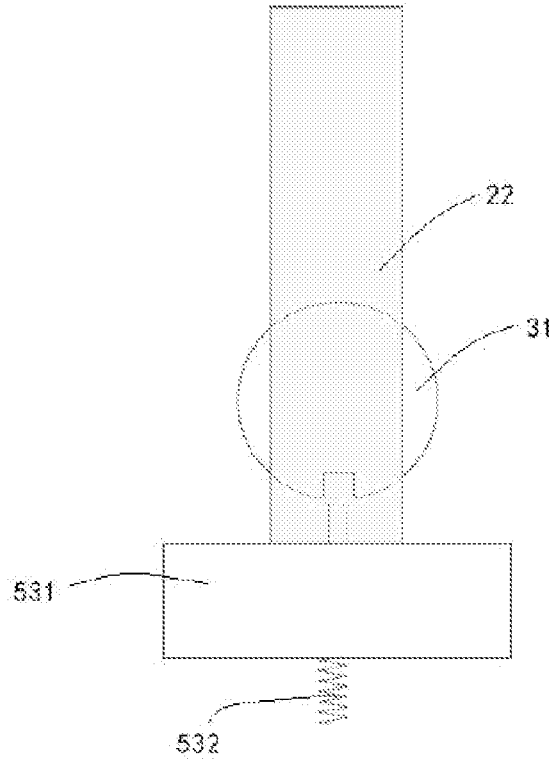
FIG. 5 illustrates a schematic diagram showing a working principle of the lock structure in FIG. 3 in a first state according to some embodiments of the present disclosure.
Figure 6:
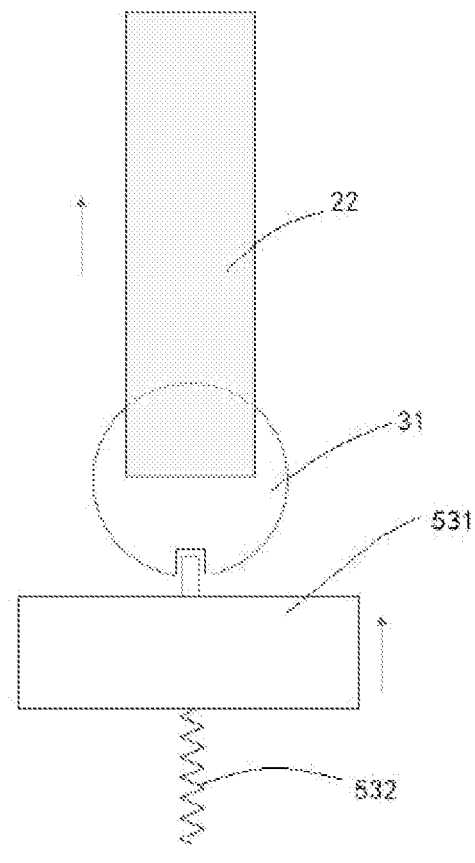
FIG. 6 illustrates a schematic diagram showing a working principle of the lock structure in FIG. 3 in a second state according to some embodiments of the present disclosure.
Figure 7:
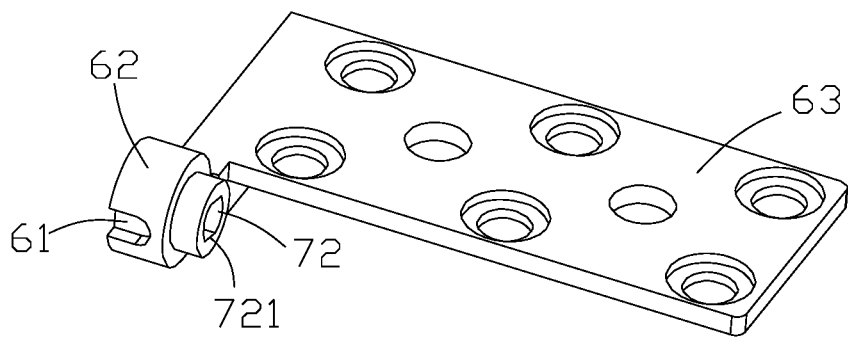
FIG. 7 illustrates a schematic structural diagram of a body connector in FIG. 3.

As shown in FIG. 7, to facilitate the lock structure 50 to restrict the rotation of the first shaft 31, a slot 61 is formed at the body connector 60. As shown in FIG. 4, the lock structure 50 includes a position-limiting connector 51 and an elastic member 52 arranged to correspond to the position-limiting connector 51. The elastic member 52 can be configured to cause the position-limiting connector 51 to be engaged with or disengaged from the slot 61. When the position-limiting connector 51 is engaged with the slot 61, the rotation of the first shaft 31 is restricted as shown in FIG. 6. When the position-limiting connector 51 is disengaged from the slot 61, the restriction on the rotation of the first shaft 31 is released as shown in FIG. 5. The position-limiting connector 51 can be integrally in a stepped shape. For example, the position-limiting connector 51 can include a first cooperation member 511 and a second cooperation member 512. A projection of the first cooperation member 511 to a direction where the second cooperation member 512 can be within the second cooperation member 512. Moreover, the first cooperation member 511 and the second cooperation member 512 can be formed integrally. The elastic member 52 can be a spring or an elastic plastic member. The position-limiting connector 51 can be engaged with and disengaged from the slot 61 through the deformation feature of the elastic member 52.

In some embodiments of the present disclosure, when the second part 22 is retracted relative to the first part, the second part 22 can press against the position-limiting connector 51 to cause the elastic member 52 to be in a compressed state as shown in FIG. 5. The elastic member 52 is in the compressed state. The position-limiting connector 51 can be disengaged from the slot 61. When the second part 22 is pulled out relative to the first part, the second part 22 can be disengaged from the position-limiting connector 51. The position-limiting connector 51 can move to be engaged with the slot 61 with a rebound function. As shown in FIG. 6, the elastic member 52 is in a natural state.

Referring back to FIG. 4, the lock structure 50 further includes a position-limiting installation member 53. An accommodation groove 531 can be formed at the position-limiting installation member 53. An end of the elastic member 52 is arranged at a groove bottom wall of the accommodation groove 531. The other end of the elastic member 52 is arranged at the position-limiting connector 51. The position-limiting connector 51 can be at least partially arranged in the accommodation groove 531 and can slide along the accommodation groove 531. Thus, by arranging the accommodation groove 531, the position-limiting connector 51 can slide in a determined path to be smoothly engaged with or disengaged from the slot 61. When the position-limiting connector 51 includes the first cooperation member 511 and the second cooperation member 512, the first cooperation member 511 can be configured to cooperate with the slot 6, and the second cooperation member 512 can be configured to cooperate with the accommodation groove 531. To prevent the position-limiting connector 51 from moving to be engaged with the slot 61, the second cooperation member 512 can be disengaged from the accommodation groove 531. A pressing plate 54 can be arranged at the accommodation groove 531. A hole for the first cooperation member 511 to pass through can be formed at the pressing plate 54. The position of the second cooperation member 512 can be limited through the pressing plate 54. Thus, the second cooperation member 512 can be prevented from being disengaged from the accommodation groove 531.

For the dual-shaft hinge, the connection device 30 can further include a second shaft 32. The second shaft 32 can be arranged at the first body 10. In some embodiments of the present disclosure, when the second body 20 is expanded from the folded state to a first angle position relative to the first body 10, the second body 20 can rotate with the first shaft 31. When the second body 20 is expanded from the first angle position to a second angle position relative to the first body 10, the second body 20 can rotate around the second shaft 32. Thus, the electronic device can move according to the predetermined trajectory in an opening process, which prevents the flexible screen from being deformed in the opening process.

Figure 9:
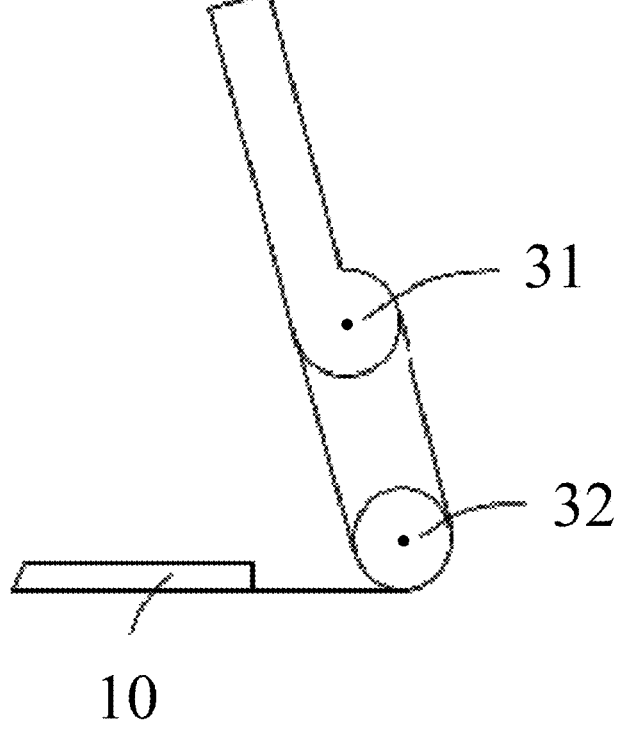
FIG. 9 illustrates a schematic structural diagram of a connection device of an electronic device (a second body being expanded to a first angle relative to a first body) according to some embodiments of the present disclosure.
Figure 10:
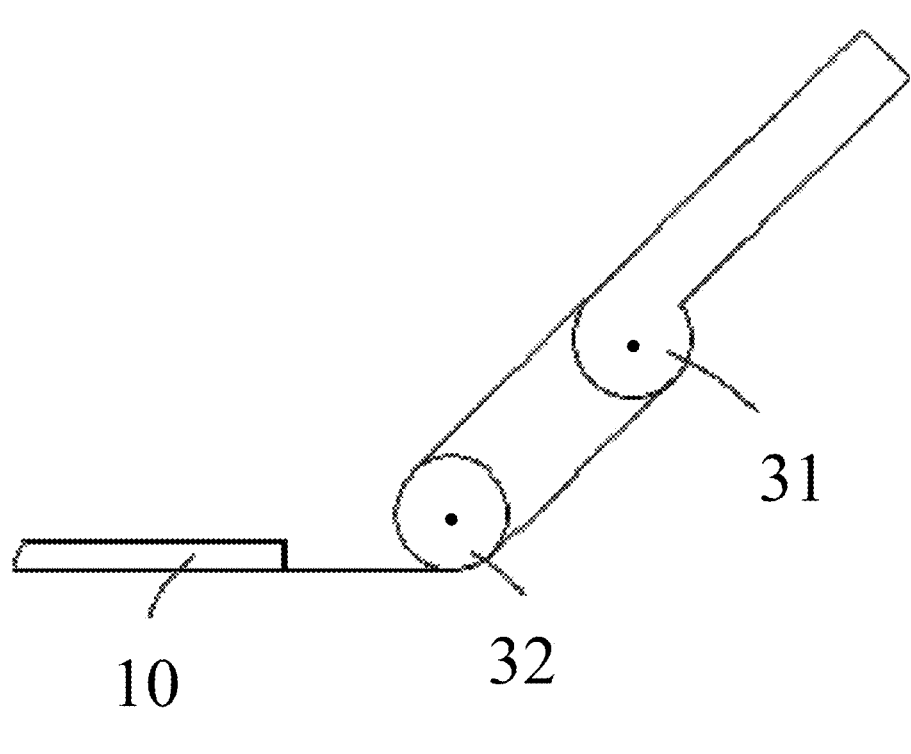
FIG. 10 illustrates a schematic structural diagram of a connection device of an electronic device (a second body being expanded to a first angle relative to a second body) according to some embodiments of the present disclosure.

The electronic device moving according to the predetermined trajectory in the opening process can be implemented through a rotation limitation mechanism. As shown in FIG. 9 and FIG. 10, in the opening process of the electronic device of the present disclosure, the rotations of the first shaft 31 and the second shaft 32 and the open and close states of the electronic device are described as follows. At an initial 0° state, an angle between the first body 10 and the second body 20 is 0°. That is, the electronic device is in the folded state. The second body 20 is fixed with the first shaft 31 through the body connector 60. The first shaft 31 can rotate around a center line of the first shaft 31. When the electronic device is at the initial 0° state, a first determined angle (e.g., 75°) can be rotated. In the rotation process from 0° to 75°, the second body 20 can rotate 75° around the center line of the first shaft 31 as shown in FIG. 9. When the electronic device is at the first angle state (open 75°), the slot 61 can be rotated with the first shaft 31 to a position corresponding to the position-limiting connector 51. The first shaft 31 can be restricted and cannot rotate the center line of the first shaft 31. When the electronic device is in the first angle state (open 75°), the electronic device can be rotated again for a second determined angle (e.g., 60°). In the rotation process from 75° to 135°, the second body 20 and the first shaft 31 can rotate 60° around a center line of the second shaft 32 as shown in FIG. 10. The rotation restriction structure can include a cam-slider structure, which is not repeated here.

The above angle positions are exemplary. In practical applications, rotating to switch positions can be adjusted according to actual needs. However, the rotation method and switch principle are the same, which are not repeated here.

In some embodiments, after the electronic device is opened to the first angle, the flexible screen can be pulled out to enlarge the display area. In embodiments of the present disclosure, when the second body 20 is at a first angle position relative to the first body 10, the slot 61 can be at the position corresponding to the position-limiting connector 51. Thus, after the electronic device is opened to the first angle, the rotation of the first shaft 31 can be restricted to prevent the electronic device from being closed to scratch the flexible screen or cause the electronic device to be abnormal.

Referring again to FIG. 4, to prevent the position-limiting installation member 53 from affecting the opening of the electronic device and ensure the electronic device moves according to the predetermined trajectory in the opening process, the position-limiting installation member 53 includes a first connection member 532. The first connection member 532 can be arranged at the first shaft 31 and can be rotatably connected to the first shaft 31.

Furthermore, the position-limiting installation member 53 also includes a second connection member 533. The second connection member 533 can be sleeved at the second shaft 32 and can be rotatably connected to the second shaft 32.

Figure 8:
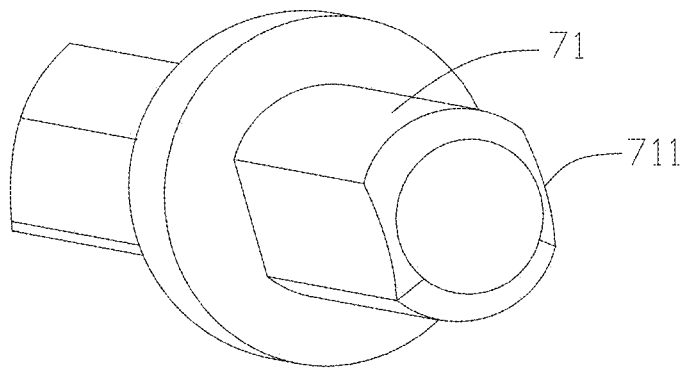
FIG. 8 illustrates a schematic local diagram of a first shaft in FIG. 3.

As shown in FIG. 7 and FIG. 8, in embodiments of the present disclosure, the body connector 60 includes a hinged 62 and a plate-shaped member 63. The hinge 62 can be configured to be fixedly connected to the first shaft 31 and cooperate with the lock structure 50. In some embodiments, the slot 61 is snapped at the hinge 62. The hinge 62 can be fixedly connected to the first shaft 31 through the lock structure. The plate-shaped member 63 can be fixed to the first part. Thus, the body connector 60 can be integrally connected to the first shaft 31 to cause the second body 20 to be integrally connected to the first shaft 31.

The lock structure can include a position-limiting connector 71 and a position-limiting connection hole 72. The relative movement between the body connector 60 and the first shaft 31 can be restricted through the cooperation between the position-limiting connector 71 and the position-limiting connection hole 72. The position-limiting connector 71 can be arranged at the first shaft 31 or can be a part of the first shaft 31. For example, two flat sides 711 facing each other can be milled at the shaft end of the first shaft 31 to form the position-limiting connector 71. The position-limiting connection hole 72 can be formed at the hinge 62. The position-limiting connection hole 72 can have a flat wall 721 corresponding to the flat edges 711.

The lock structure is not limited to the above structure form in which the position-limiting connector 71 cooperates with the position-limiting connection hole 72. The lock structure also includes tight fitting or connection using a fastener, as long as the relative movement between the body connector 60 and the first shaft 31 can be limited.

In the present disclosure, the direction or position relationship indicated by directional terms is generally the direction or position relationship shown in the accompanying drawings, which facilitates the description of the present disclosure and simplification of the description. Without opposite indications, these directional terms do not indicate or imply that the devices or elements referred to must have specific orientations or be constructed and operated in specific orientations. Therefore, the terms cannot be considered to limit the scope of the present disclosure. The terms "inside" and "outside" refer to the inside and outside of the contour relative to the members.

To facilitate the description, spatially relative terms such as "above," "on top of," "on the upper surface of," and "above" are used here to describe the spatial position relationship between one or more members or features with other members or features. The spatial relative terms include not only the orientation described in the figures but also different orientations used or operated. For example, if the members in the accompanying drawings are completely reversed, the member being above other members or features or on the other members or features can include the members being under the other members or structures or below the other members or structures. Thus, the term "on" can include "above" and "below" the two orientations. In addition, the members or features can also be positioned according to different angles (e.g., rotating 90° or other angles), which are included in the present disclosure.

The terms used here are only for describing specific embodiments and are not intended to limit the exemplary embodiments according to the present disclosure. Unless otherwise specified in the context, the singular form also intends to include the plural form. Furthermore, when terms such as "comprising" and/or "including" are used in this specification, the terms can indicate the features, steps, operations, assemblies, and/or a combination thereof.

The description and the terms "first" and "second" in the claims and the accompanying drawings are used to distinguish similar objects and are not used to describe a specific sequence or order. The data used in the situation can be exchanged in a suitable situation. Thus, embodiments of the present disclosure can be implemented in an order other than the order shown in the figure or described here.

The present disclosure has been described through the above embodiments. However, the above embodiments are only used for illustrative and explanatory purposes and do not limit the scope of embodiments of the present disclosure. Furthermore, those skilled in the art can understand that the present disclosure is not limited to the above embodiments. Various modifications and variations can be made according to the teachings of the present disclosure. These modifications and variations are within the scope of the present disclosure. The scope of the present disclosure is subject to the scope of the appended claims and the equivalent scope.

What is claimed is:

1. An electronic device comprising:
a first body;
a second body including a first part and a second part, wherein the second part is slidable to be pulled out relative to the first part or retracted; and
a connection device connecting the first body and the first part, and including a first shaft connected to the first part;
wherein:
the first part includes a lock structure;
in response to the second part being retracted relative to the first part, the lock structure is in a first state;
in the first state, the first part is able to rotate with the first shaft to fold the second body relative to the first body;
in response to the second part being pulled out relative to the first part, the lock structure is in a second state; and
in the second state, the lock structure restricts a rotation of the first shaft to prevent the second body from being folded relative to the first body.

2. The electronic device according to claim 1, wherein:
a body connector having a slot is arranged at a shaft end of the first shaft;
the lock structure includes a position-limiting connector and an elastic member arranged to correspond to the position-limiting connector;
the elastic member is configured to cause the position-limiting connector to be engaged with or disengaged from the slot;
in response to the position-limiting connector being engaged with the slot, the first shaft is restricted to rotate; and
in response to the position-limiting connector being disengaged from the slot, rotation restriction of the first shaft is released.

3. The electronic device according to claim 2, wherein:
in response to the second part being retracted relative to the first part, the second part presses against the position-limiting connector to compress the elastic member, and the position-limiting connector is disengaged from the slot; and
in response to the second part being pulled out relative to the first part, the second part is disengaged from the position-limiting connector, and the position-limiting connector moves to be engaged with the slot under a rebound function of the elastic member.

4. The electronic device according to claim 2, wherein the lock structure further includes a position-limiting installation member including:
an accommodation groove, an end of the elastic member being arranged at a groove bottom wall of the accommodation groove, another end of the elastic member being arranged at the position-limiting connector, and the position-limiting connector being partially arranged in the accommodation groove and being able to slide along the accommodation groove.

5. The electronic device according to claim 4, wherein the connection device further includes a second shaft arranged at the first body:
when the second body is unfolded from a folded state to a first angle position relative to the first body, the second body rotates with the first shaft; and
when the second body is unfolded from the first angle position to a second angle position relative to the first body, the second body rotates around the second shaft.

6. The electronic device according to claim 5, wherein when the second body is at the first angle position relative to the first body, the slot is at a position corresponding to the position-limiting connector.

7. The electronic device according to claim 5, wherein the position-limiting installation member includes a first connection member sleeved at the first shaft and rotatably connected to the first shaft.

8. The electronic device according to claim 7, wherein the position-limiting installation member includes a second connection member sleeved at the second shaft and rotatably connected to the second shaft.

9. The electronic device according to claim 2, wherein the body connector includes:
a hinge fixedly connected to the first shaft through the lock structure; and
a plate-shaped member fixedly arranged at the first part.

10. The electronic device according to claim 9, wherein the lock structure includes:
a position-limiting connection member arranged at the first shaft; and
a position-limiting connection hole arranged at the hinge;
wherein relative movement between the body connector and the first shaft is restricted through cooperation between the position-limiting connection member and the position-limiting connection hole.

* * * * *